(12) United States Patent
Thelen

(10) Patent No.: US 7,360,420 B2
(45) Date of Patent: Apr. 22, 2008

(54) METHOD AND BEARING FOR BALANCING ROTORS WITHOUT JOURNALS

(75) Inventor: Dieter Thelen, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 268 days.

(21) Appl. No.: 10/556,702

(22) PCT Filed: May 4, 2004

(86) PCT No.: PCT/DE2004/000941

§ 371 (c)(1),
(2), (4) Date: Nov. 10, 2005

(87) PCT Pub. No.: WO2004/102147

PCT Pub. Date: Nov. 25, 2004

(65) Prior Publication Data
US 2007/0006649 A1    Jan. 11, 2007

(30) Foreign Application Priority Data
May 13, 2003  (DE) .............................. 103 21 606

(51) Int. Cl.
*G01M 1/16* (2006.01)
(52) U.S. Cl. .......................................... 73/471; 73/472
(58) Field of Classification Search ................ 73/459, 73/460, 462, 471, 472, 474
See application file for complete search history.

(56) References Cited

U.S. PATENT DOCUMENTS

| | | | |
|---|---|---|---|
| 1,486,115 A | 3/1924 | Allen | |
| 3,152,483 A | 10/1964 | Hemmeter | |
| 3,570,278 A | 3/1971 | Lannen | |
| 4,543,825 A | 10/1985 | Schönfeld et al. | |
| 4,688,427 A | 8/1987 | Hyland, Jr. | |

FOREIGN PATENT DOCUMENTS

| | | |
|---|---|---|
| CH | 500 480 A | 12/1970 |
| CH | 542 436 | 9/1973 |
| DE | 587740 | 11/1933 |
| DE | 2 123 505 | 5/1971 |
| DE | 44 41 951 A1 | 5/1996 |
| EP | 0 104 266 A1 | 4/1984 |

OTHER PUBLICATIONS

Endert, H.: Das Strömungslager als Bauelement der Feinmechanik In: Feingerätetechnik, 4, vol. 7, Jul. 1955, pp. 291-296. w/English Abstract.

*Primary Examiner*—John E. Chapman
(74) *Attorney, Agent, or Firm*—Collard & Roe, P.C.

(57) ABSTRACT

In order to be able to determine the imbalance of rotors (2) with pocket hole bores with great precision in a bearing arrangement with a bearing mandrel (5) for holding a rotor (2), without journals but having a bore (6), in a balancing device, in which the bearing mandrel (5) has orifices (10, 20) for the passage of fluid, a fluid supply to a fluid chamber (40) disposed between the end of the pocket hole bore and the end of the bearing mandrel is provided to form a cushion of fluid with which the rotor is supported in the axial direction.

16 Claims, 2 Drawing Sheets

METHOD AND BEARING FOR BALANCING ROTORS WITHOUT JOURNALS

CROSS REFERENCE TO RELATED APPLICATIONS

Figure 1:
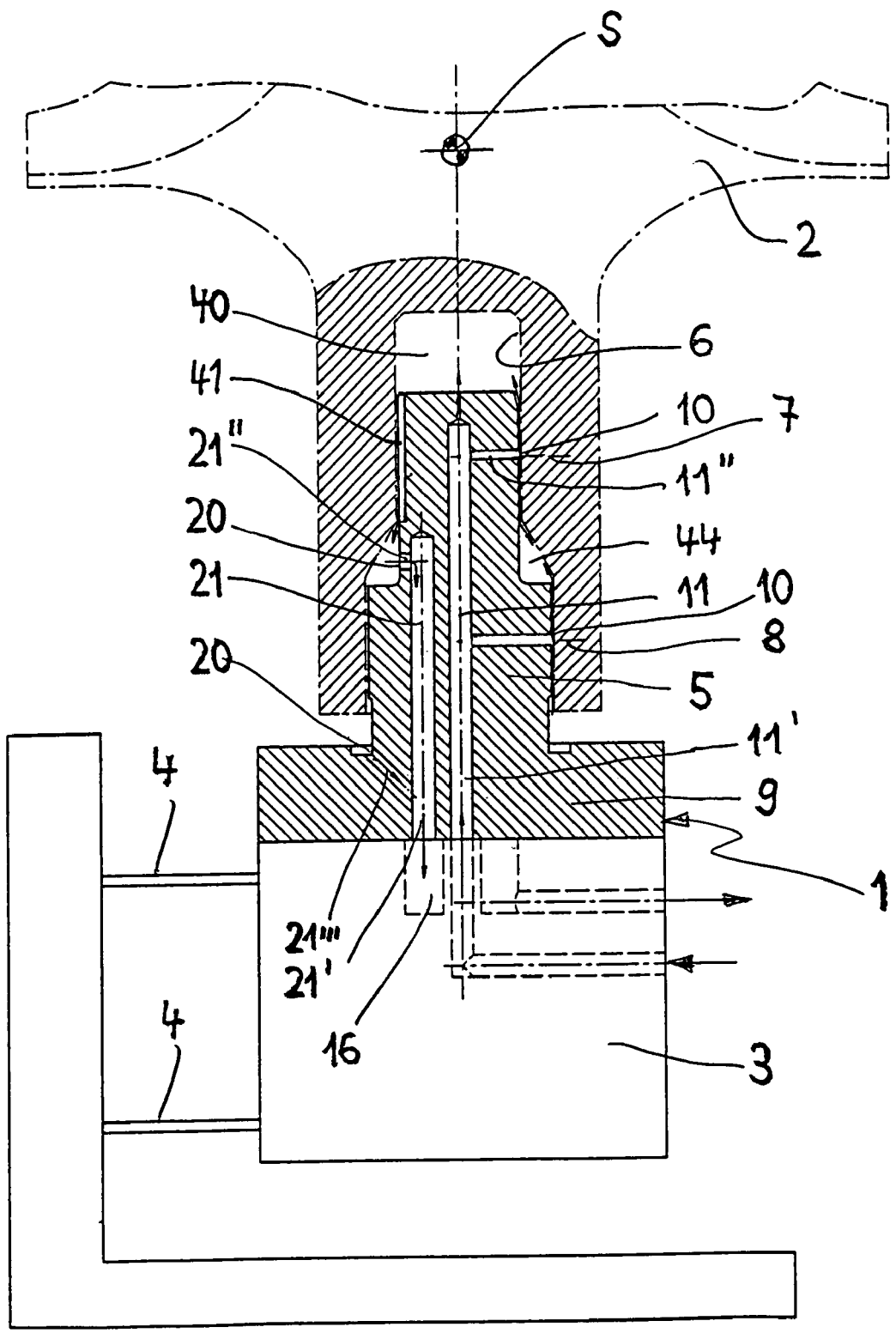

Applicant claims priority under 35 U.S.C. §119 of German Application No. 103 21 606.5 filed May 13, 2003. Applicant also claims priority under 35 U.S.C. §365 of PCT/DE2004/000941 filed May 4, 2004. The international application under PCT article 21(2) was not published in English.

The invention relates to a method for balancing rotors without journals and to a bearing arrangement with a bearing mandrel for holding a rotor, without journals but having a bore, in a balancing device.

It is possible to balance a rotor with journals precisely in relation to its bearings, arranged on the journals. Rotors without their own bearings, which are to be balanced and are clamped onto an auxiliary shaft during balancing, cause problems in respect of the quality of balancing achievable.

From EP 0 104 266 A1 a method is known, with which rotors without journals can be balanced without an auxiliary shaft with high balancing quality. For this, the rotor is mounted on a bearing mandrel of a balancing machine and bearing fluid is brought between faces of rotors and bearing mandrels located opposite one another. Errors caused by surface inaccuracies no longer appear, as differences in shape of the rotor bore or of the bearing mandrel are compensated and a stable axis of rotation of the rotor is provided. In the axial direction the rotor is supported by an annular face on an annular support face of the bearing mandrel. In the event of axial run-out errors, for example, this may lead to less accurate measuring results.

The object of the invention is to provide a method and a bearing arrangement for balancing rotors without journals, with which the imbalance of rotors without journals can be determined with great precision.

According to the invention this object is achieved in one aspect by a method for balancing rotors without journals, in which the rotor, which has a bore, is arranged on a bearing mandrel of a balancing device and fluid is brought between rotor and bearing mandrel faces located opposite one another and the rotor is set into rotation, wherein oscillations of the bearing mandrel induced by imbalance are drawn on to determine the imbalance, and wherein the rotor is supported in a first bearing region in the radial direction by means of a liquid and in the bearing arrangement of a rotor which has a pocket hole bore it is supported in a second bearing region in a presettable axial position on the bearing mandrel by supplying fluid to a fluid chamber positioned between the end of the pocket hole bore and the end of the bearing mandrel. In another aspect, this object is achieved by a bearing arrangement with a bearing mandrel for holding a rotor, without journals but having a bore, in a balancing device in at least one first and one second bearing region, the bearing mandrel having orifices for the passage of fluid, wherein first orifices for fluid supply and at least one second orifice for fluid discharge are provided in the bearing mandrel, when holding a rotor having a pocket hole bore the bearing arrangement has a fluid chamber constructed between the end of the pocket hole bore and the end of the bearing mandrel, which has at least one inlet and one outlet channel and the bearing mandrel has at least the outlet channel.

For the first time the invention deliberately takes advantage of the excess pressure which builds up in the bearing bore above the end of the bearing mandrel, owing, e.g. to the fluid emerging from the gap in the bearing when rotors without journals and without a continuous bearing bore are balanced. To date the build-up of excess pressure has been prevented by pressure relief bores. According to the invention, the excess pressure is deliberately used to bear the weight of the rotor.

The rotor rotates on the bearing mandrel in a predetermined constant position in respect of the axial direction. There is no expensive separate bearing arrangement of the rotor in the axial direction. This also ensures that the rotor rotates on an axial bearing free of surface contact. The rotor runs more quietly, thus improving the quality of balancing.

Advantageously, according to the teaching of the invention, all rotors without their own bearing journals, having pocket hole bores or continuous bores, such as, for example, compressor impellers, flywheels, etc., can be balanced; continuous rotor bores are in this case closed with a sealing plug for the balancing process, so a cushion of fluid can build up after the rotor has been placed on the bearing mandrel.

A different fluid can be used to support the rotor in the radial direction from that used for support in the axial direction. For example, liquid can be used as fluid for the radial support and for the axial support, a gaseous medium, preferably air can be used. Particularly simple in regard to the construction of the device measuring the imbalance is the use of only one fluid for both bearing regions. Particularly advantageously the fluid supply and fluid discharge is carried out by conduits running inside the bearing mandrel. If liquid is used as fluid, a practically completely encapsulated liquid circuit is achieved.

Figure 1A:
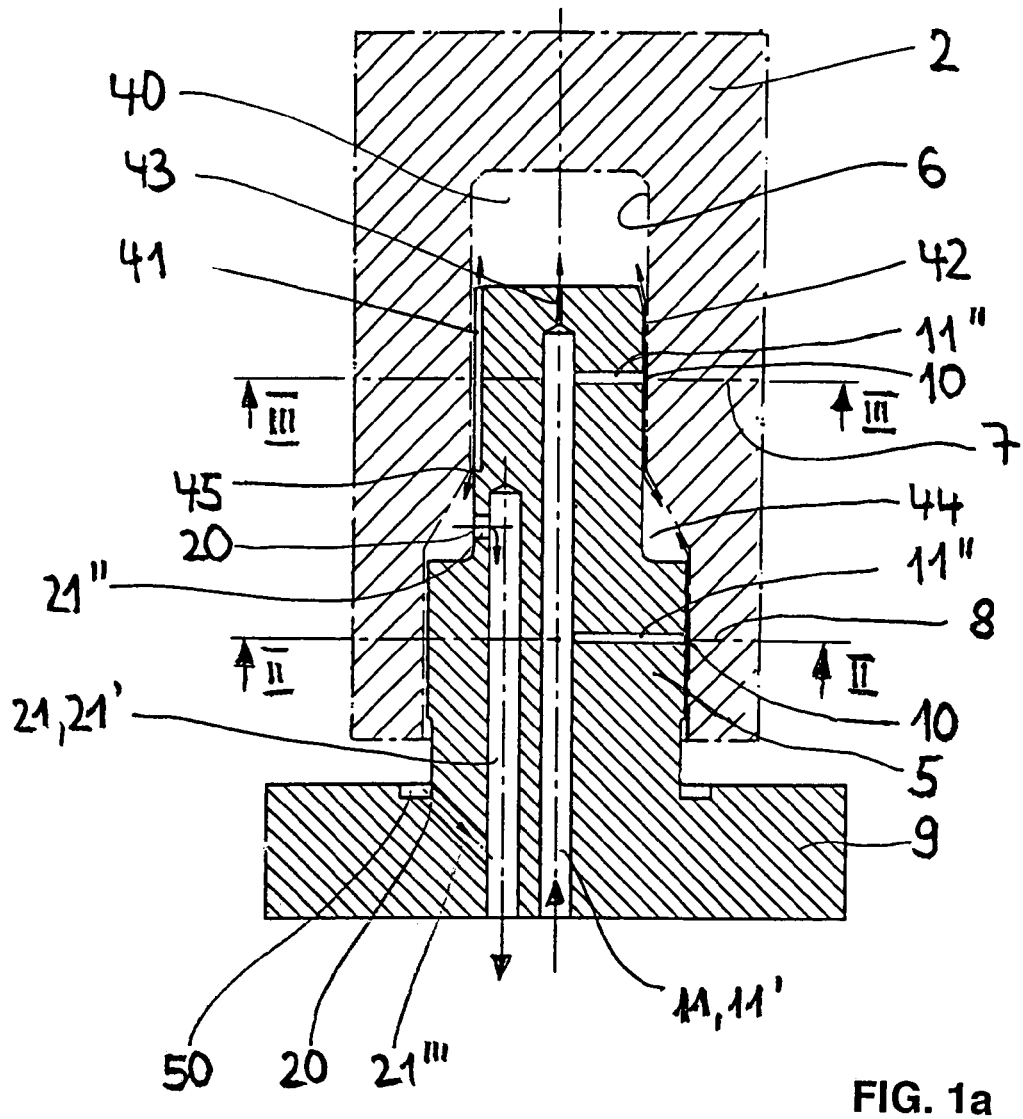
Figure 2:
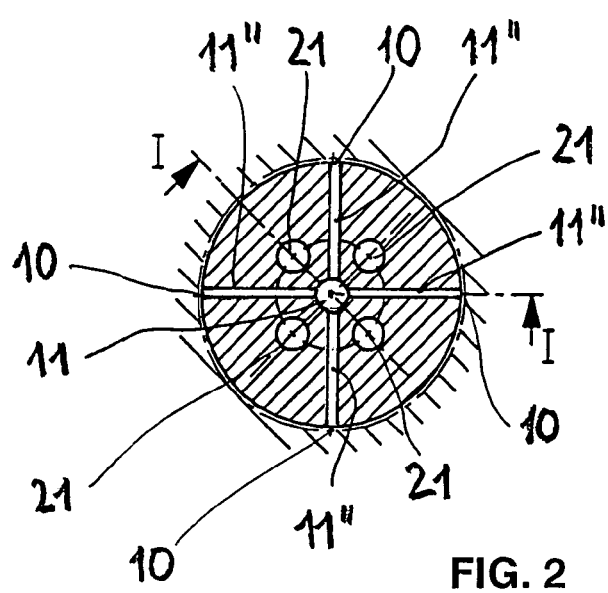
Figure 3:
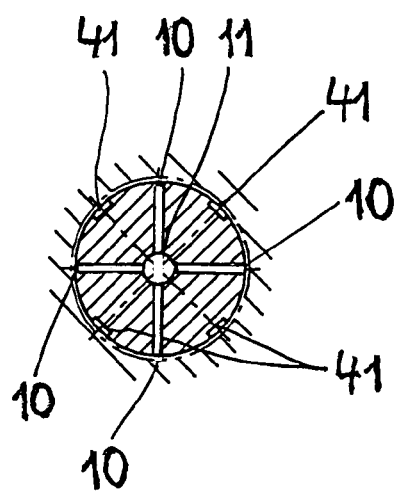

The invention is explained below in greater detail using embodiments, wherein:

FIG. 1 shows a bearing arrangement with a bearing mandrel for a rotor having a pocket hole bore in a balancing device in schematic illustration;

FIG. 1*a* shows a detail of the bearing arrangement according to FIG. 1;

FIG. 2 shows the bearing mandrel in a sectional illustration along line II-II in FIG. 1*a*; and FIG. 3 shows a sectional illustration of the bearing mandrel along line III-III in FIG. 1*a*.

The bearing arrangement 1 illustrated in FIG. 1 for a rotor 2 to be examined, illustrated in FIG. 1 in dot-dash lines, is fixed to a swing bridge 3 of a balancing device. The bearing arrangement 1 has a bearing mandrel 5, on which the rotor 2 to be examined and/or balanced is rotatably mounted. The swing bridge 3 is supported in the normal way via, e.g. four supporting springs 4, only two of which are illustrated here, as capable of swinging against the frame of the balancing device. The rotor 2 is set into rotation by a drive, not illustrated in greater detail here. Oscillations of the bearing mandrel or swing bridge 3 induced by an imbalance are measured and drawn on to determine the imbalance to be compensated for on the rotor 2.

The rotor 2 has a non-continuous central rotor bore 6, in other words a pocket hole bore, by means of which the bearing is carried out on the vertically arranged bearing mandrel 5. The centre of gravity S of the rotor 2 is located in the axial direction outside the extension of the pocket hole bore, in other words outside the bearing region. The pocket hole bore is graduated and has two sections of different diameter. The section starting from the lower end face of the rotor, like the section located at the end of the pocket hole bore, is provided on the bearing mandrel 5 in a first region in the radial direction for hydrostatic support of the rotor 2 by means of bearing fluid. The rotor 2 is supported by means of bearing fluid in a second region in the axial direction via a cushion of fluid in a fluid chamber 40, formed between the end face of the bearing mandrel 5 and the end of the pocket hole bore.

In the first and second bearing regions in this embodiment, oil or an oily liquid or some other fluid suitable for hydrodynamic lubrication is used as bearing fluid.

The bearing mandrel 5 has on its surface first orifices 10 (FIG. 2, FIG. 3) for the passage of bearing fluid, connected to a fluid supply conduit 11 inside the bearing mandrel, and also second orifices 20 for the passage of bearing fluid, connected to fluid discharge conduits 21 inside the bearing mandrel. Furthermore, the bearing mandrel 5 has a third orifice on its upper end face, which is connected to the fluid supply conduit 11.

The first orifices 10 are located in two bearing planes 7, 8 at an axial distance from one another in the first region which are associated with the two sections of the pocket hole bore of the rotor 2 and in which the rotor 2 is hydrostatically supported in the radial direction. The bearing mandrel 5 has a collar 9 on its lower end with which it is fixed on the swing bridge 3.

The fluid supply for each of the two bearing planes 7, 8 of the first region takes place via a centrally running supply conduit section 11', connected to radially extending supply conduit sections 11", ending in the four first orifices 10 for each bearing plane 7, 8. The centrally running supply conduit section 11' is connected to a fluid supply, which preferably runs through the swing bridge 3, but which can also be provided in the collar 9 of the bearing mandrel 5.

The fluid supply conduit 11 has throttle segments for supplying the fluid to the bearing planes 7, 8, which throttle segments have a small cross-section for the purpose of a throttle effect on the fluid, wherein, as well as over the chosen cross-section, the throttle effect can also easily be set over the length of the throttle segment. For this, for example, the supply conduit section 11' running centrally in the axis of the bearing mandrel can be provided with a throttle section. In the embodiment illustrated it is provided that only the radially extending conduit sections 11" associated with the orifices 10 have a throttle effect.

For fluid discharge four non-continuous bores 21, distributed equidistantly on a partial circle and running parallel to the axis of the mandrel, are provided, which are connected in several cross-sectional planes to one orifice 20 in each case on the circumference of the bearing mandrel via radial bores 21" or fluid channels 21'''. The orifices 20 associated in each case with a bore 21 are located, e.g. behind one another on a surface line running parallel to the axis of the bearing mandrel. In a cross-sectional plane between the bearing planes 7, 8 are located several, in this case four, orifices 20 for fluid discharge, one of which is connected in each case via a radial bore 21" to the next bore 21. On the shoulder of the collar 9 on the bearing mandrel 5 are located in an annular indentation 50, four further orifices 20 for fluid discharge, one of which in each case is connected to the next bore 21 via radially and obliquely running fluid channels 21'''. The four bores 21 end in an annular chamber 16 arranged on the lower end face of the bearing mandrel 5. The annular chamber 16 is connected to a fluid suction device. The annular chamber 16 is preferably arranged, as illustrated, in the swing bridge 3, but can also be provided in the collar 9 of the bearing mandrel 5.

To support the rotor 2 in the axial direction in the second region via a cushion of fluid in the fluid chamber 40, the fluid supply into the fluid chamber 40 takes place via an inlet channel comprising the annular gap 42 between the outer circumference of the bearing mandrel and the associated wall of the bore. In the embodiment illustrated, the inlet channel further comprises a bore 43 of small cross-section, which starts from the central fluid supply conduit 11 and ends in the end face of the bearing mandrel 5.

The fluid chamber 40 is connected via an outlet channel, formed in the embodiment illustrated by a longitudinal groove 41 on the outer circumference of the bearing mandrel 5, to the second orifice 20 in the bearing mandrel 5. The outlet channel ends in an annular space 44, formed on one side by a transition section between a first upper and a second lower section of the pocket hole bore and on the other side by a transition section between the upper and lower sections of the bearing mandrel 5. The fluid discharge conduit 21 with the orifice 20 ends in the annular space 44.

The annular edge between the transition section of the pocket hole bore and the upper section of the pocket hole bore forms a control edge 45, which on displacement of the rotor 2 on the bearing mandrel 5 changes the cross-section of the outlet orifice of the longitudinal groove 41 into the annular space 44. If the fluid pressure in the pressure chamber 40 increases to above a limit pressure, by axial displacements of the rotor 2 the control edge 45 opens the outlet orifice and adjusts to this limit pressure. The limit pressure is the pressure at which the rotor 2 on the bearing mandrel 5 adopts a constant position in the axial direction. When rotors of identical construction but of a different material, e.g. made of a steel or titanium alloy, are balanced, the limit pressure is different, owing to the different weight of the rotor, whereas the constant position of the rotor on the bearing mandrel in the axial direction is practically identical in both rotor materials.

The supply orifices 10 in the bearing regions may differ in number and arrangement from the embodiments described, a minimum number of three being required. The throttle effect is fixed as a function of the shape of the rotor and the weight of the rotor and also of the fluid used.

The number and arrangement of the discharge orifices 20 are examples only. They conform with the fluid used and the configuration of the rotor and the bearing arrangement.

Instead of the longitudinal groove 41, in a way not illustrated an outlet bore may be provided, starting from the end face of the bearing mandrel 5 and ending at the outer circumference of the bearing mandrel 5, the outlet orifice of which can be adjusted by the control edge 45 in the previously described manner.

With the bearing arrangement of the rotor 2 in the second region, in other words support in the axial direction via a cushion of fluid, it may prove advantageous to use a gaseous medium, preferably air as fluid, instead of a liquid. The support in the radial direction via a liquid is relatively rigid, whereas the support in the axial direction via an air cushion is more flexible.

The orientation of the bearing mandrel axis, e.g. vertical or an orientation inclined towards the horizontal, can be fixed taking into consideration the configuration of the balancing device and the method of supplying the rotors, e.g. with automated delivery and removal.

The bearing arrangement disposed on the swing bridge makes possible all measuring processes for determining the imbalance according to position and size. The support of the swing bridge can be constructed for subcritical or supercritical operation.

The invention is not restricted to the examination of rotors with pocket hole bores. All rotors without their own bearing journals, which have pocket hole bores or continuous bores, such as, for example, compressor impellers, flywheels, etc., can be balanced. Continuous bores are closed with a sealing plug for the balancing process, so an enclosed fluid chamber can form after the rotor has been placed on the bearing mandrel.

The configuration of the bearing mandrel conforms in detail to the rotor to be balanced, in particular to the shape of the pocket hole bore or the continuous bore of the rotor.

The invention claimed is:

1. Method for balancing rotors without journals, in which the rotor (2), which has a pocket hole bore (6), is arranged on a bearing mandrel (5) of a balancing device and fluid is brought between rotor and bearing mandrel faces located opposite one another and the rotor (2) is set into rotation, wherein oscillations of the bearing mandrel (5) induced by imbalance are used to determine the imbalance, wherein the rotor (2) is supported in a first bearing region in the radial direction by means of a liquid and in the bearing arrangement of a rotor (2) which has a pocket hole bore it is supported in a second bearing region in a presettable axial position on the bearing mandrel (5) by supplying fluid to a fluid chamber (40) positioned between the end of the pocket hole bore and the end of the bearing mandrel.

2. Method according to claim 1, wherein the presettable axial position of the rotor (2) on the bearing mandrel (5) is set by changing the volume of the fluid chamber (40).

3. Method according to claim 1, wherein the volume of the fluid chamber (40) is changed by pressure build-up in the fluid chamber (40).

4. Method according to claim 3, wherein with a rotor (2) held with an axis inclined towards the horizontal plane, the axial position of the rotor (2) on the bearing mandrel (5) is determined by the pressure arising in the fluid chamber (40) owing to the weight component of the rotor (2) and the pressure of the fluid supply, the pressure in the fluid chamber (40) being limited to a presettable value.

5. Method according to claim 4, wherein at least one outlet channel is provided between associated rotor and bearing mandrel faces, the flow cross-section of which is changed to limit the pressure.

6. Method according to claim 1, wherein the support in the first and second bearing regions is performed by means of a liquid, wherein said liquid is an oil or oily liquid as fluid.

7. Bearing arrangement with a bearing mandrel (5) for holding a rotor (2), without journals but having a bore, in a balancing device in at least one first and one second bearing region, the bearing mandrel (5) having orifices for the passage of fluid, wherein first orifices (10) for fluid supply and at least one second orifice (20) for fluid discharge are provided in the bearing mandrel, when holding a rotor (2) having a pocket hole bore the bearing arrangement has a fluid chamber (40) constructed between the end of the pocket hole bore and the end of the bearing mandrel, which has at least one inlet and one outlet channel and the bearing mandrel (5) has at least the outlet channel.

8. Bearing arrangement according to claim 7, wherein the first orifices (10) are located on bearing mandrel circumferential faces in the first bearing region.

9. Bearing arrangement according to claim 7, wherein the first orifices (10) are located in two bearing planes (7, 8) of the bearing mandrel (5) at an axial distance from one another.

10. Bearing arrangement according to claim 7, wherein the second orifice (20) is arranged adjacent to the bearing planes (7, 8) and/or between them.

11. Bearing arrangement according to claim 7, wherein the inlet channel is formed by the annular gap (42) between the outer circumference of the bearing mandrel and the wall of the bore and/or a bore(43) ending in the end face of the bearing mandrel (5).

12. Bearing arrangement according to claim 7, wherein the outlet channel is connected to the second orifice (20) and is formed by at least one exterior longitudinal groove (41) of the bearing mandrel (5) starting from the end face of the bearing mandrel (5) and/or an outlet bore.

13. Bearing arrangement according to claim 12, wherein the outlet orifice of the longitudinal groove (41) connecting the fluid chamber (40) to the second orifice (20) in the bearing mandrel (5) and/or the outlet bore can be covered by the wall of the rotor bore (6).

14. Bearing arrangement according to claim 7, wherein inside the pocket hole bore an annular space (44) is constructed between the rotor (2) and the bearing mandrel (5), which is connected to the outlet channel and the second orifice (20).

15. Bearing arrangement according to claim 14, wherein the annular space (44) is formed on one side by a transition section between a first and a second section of the pocket hole bore and on the other side by a transition section between a first and a second section of the bearing mandrel (5).

16. Bearing arrangement according to claim 15, wherein a control edge (45) is formed between the transition section and the section of the pocket hole bore in which the fluid chamber (40) is located.

* * * * *